United States Patent [19]

Specie

[11] Patent Number: 4,505,489

[45] Date of Patent: Mar. 19, 1985

[54] DOLLY SYSTEM FOR CAMPGROUNDS

[76] Inventor: Roy L. Specie, P.O. Box 635, Bradenton, Fla. 33506

[21] Appl. No.: 452,412

[22] Filed: Dec. 23, 1982

[51] Int. Cl.³ .............................................. B62B 1/12
[52] U.S. Cl. ........................... 280/47.13 R; 280/43.17; 280/47.23; 280/638; 280/659
[58] Field of Search ...................... 280/47.13 R, 47.17, 280/47.24, 47.23, 638, 659, 47.37 R, 43.24

[56] References Cited

U.S. PATENT DOCUMENTS

| | | | |
|---|---|---|---|
| 2,215,425 | 9/1940 | Longfellow | 280/47.13 R |
| 2,683,610 | 7/1954 | Brown | 280/47.13 |
| 2,816,771 | 12/1957 | Hunt | 280/47.13 |
| 2,938,571 | 5/1960 | Simmerman | 280/43.24 |
| 3,052,480 | 9/1962 | Sanstrom | 280/43.13 |
| 3,100,653 | 8/1963 | Ibaugh et al. | 280/638 |
| 3,105,698 | 10/1963 | Bonarrigo et al. | 280/47.13 |
| 3,782,748 | 1/1974 | Poland | 280/47.13 |
| 4,060,258 | 11/1977 | Pigeon | 280/638 |
| 4,178,996 | 12/1979 | Johnson | 280/79.1 A |
| 4,407,521 | 10/1983 | Zeitlin | 280/638 |

*Primary Examiner*—Richard A. Bertsch
*Attorney, Agent, or Firm*—Benjamin P. Reese, II

[57] ABSTRACT

A dolly system for campgrounds, parks and the like. A picnic table dolly, a general purpose dolly and various attachments for the general purpose dolly are included in the system. The picnic table dolly is suitable for use alone or in combination with the general purpose dolly for moving conventional picnic tables. The various attachments for the general purpose dolly adapt it for movement of garbage cans, trailers, charcoal grills and the like, firewood and other similar heavy objects commonly found in campgrounds, parks and the like.

10 Claims, 17 Drawing Figures

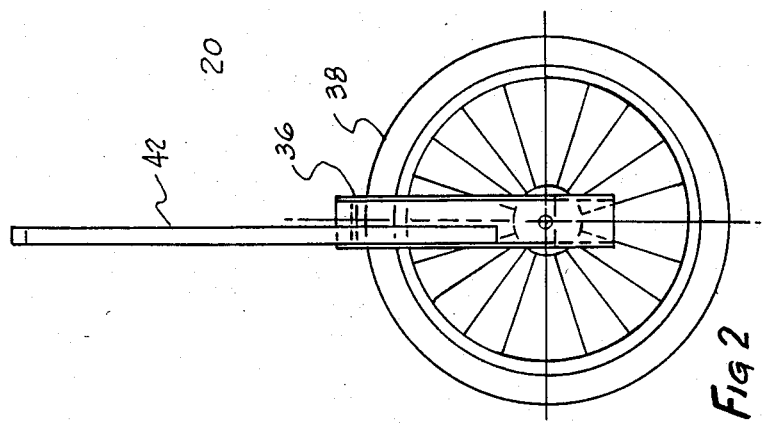
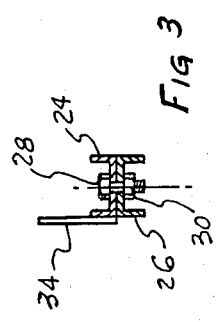
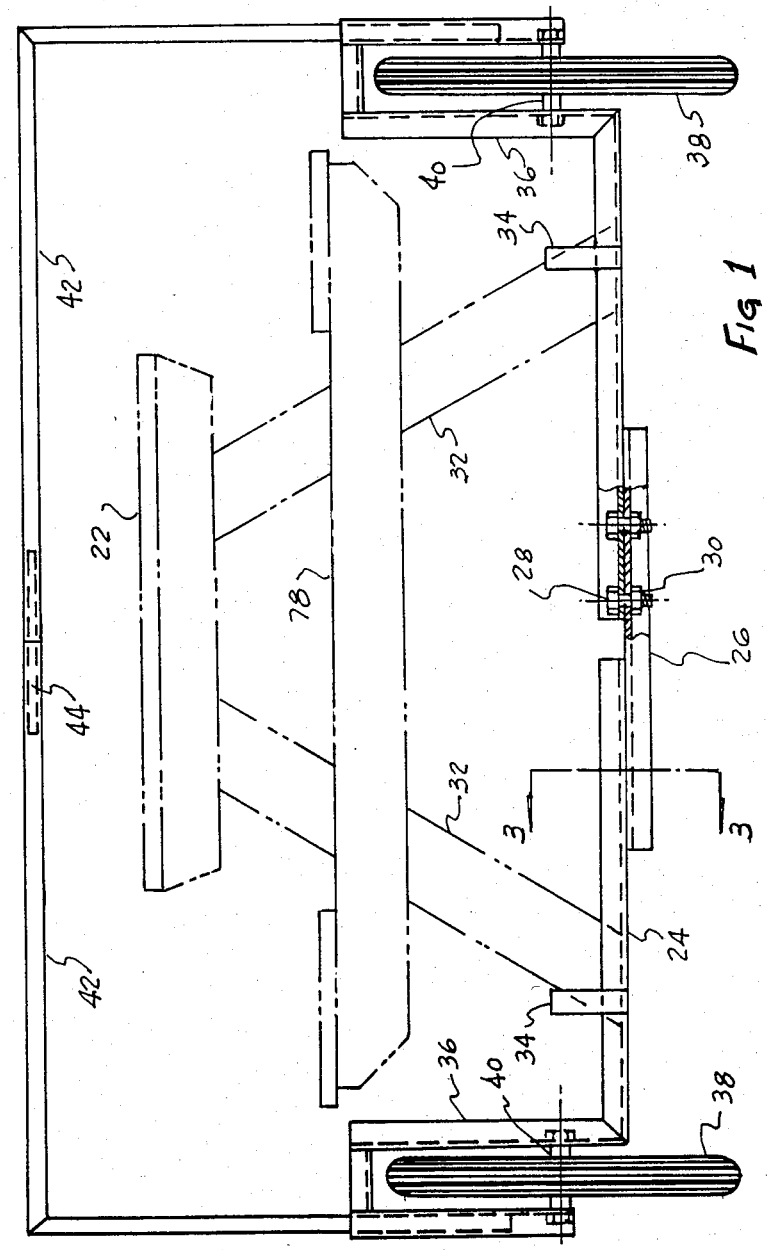

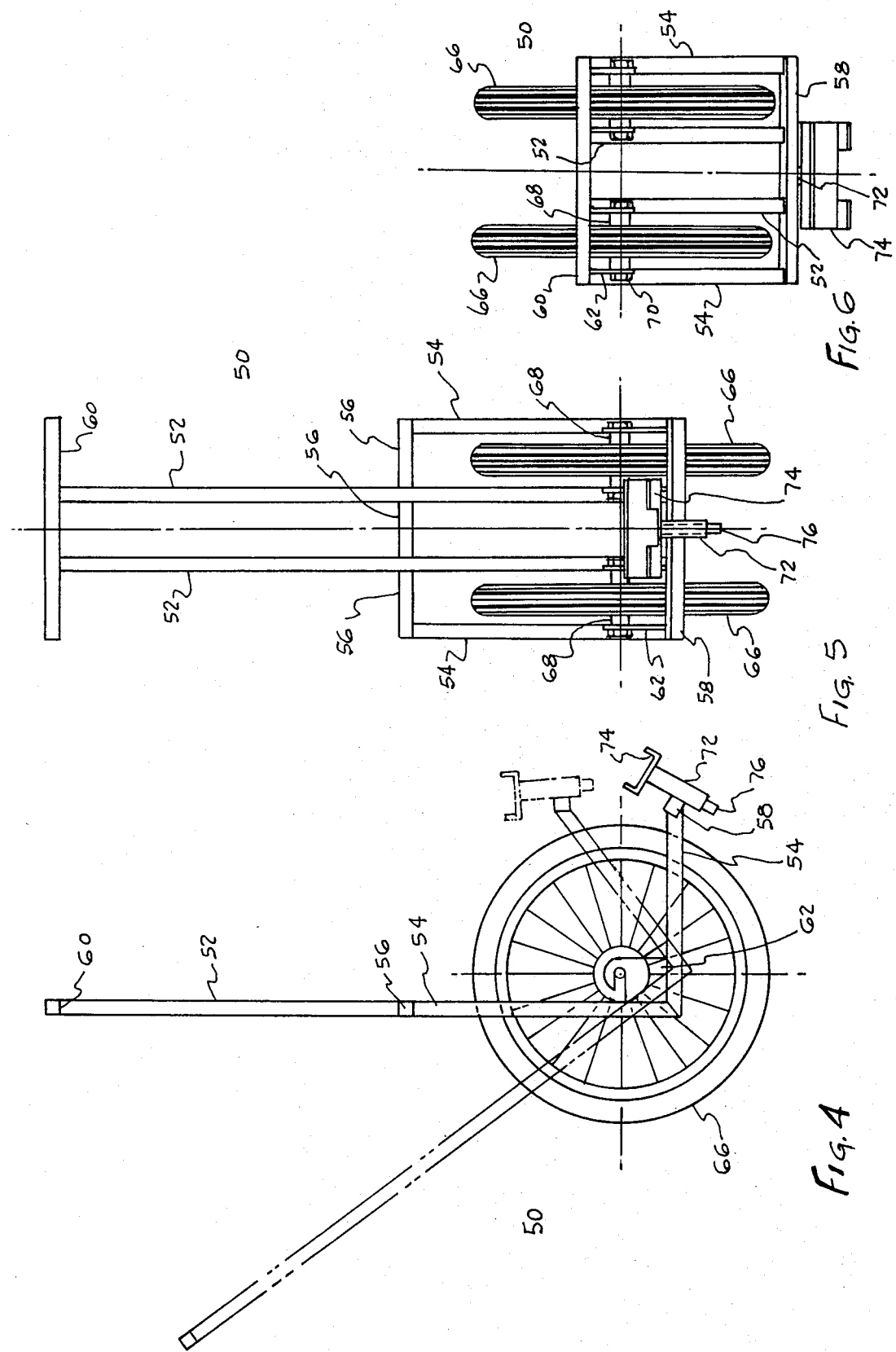

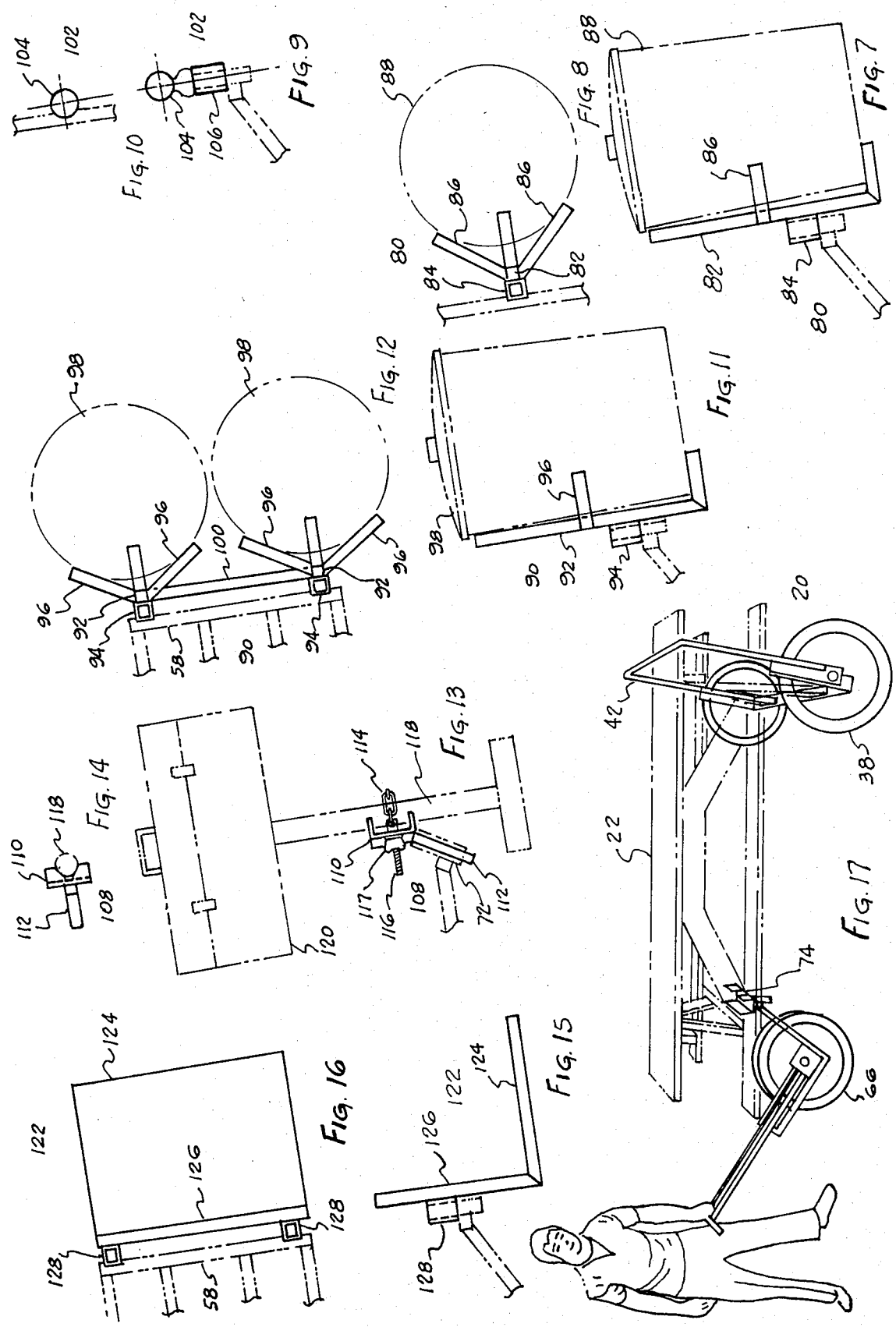

DOLLY SYSTEM FOR CAMPGROUNDS

BACKGROUND OF THE INVENTION

This invention relates to a dolly system for campgrounds, parks and the like.

It is well known that campgrounds, parks and the like often have picnic tables, charcoal grills, garbage cans and other heavy objects placed on lawns and other off-the-road locations. It is often necessary to move such objects during routine campground and park maintenance activities. Typically, two persons are required for the convenient movement of picnic tables and certain other of such objects. However, it is often the case that only one person is available for the movement of such objects in many campgrounds and parks, particularly those in remote areas.

Even when two persons are available, the movement of picnic tables and certain other of such objects is often a difficult task. It is often the case that the location of such objects within the the campground or park prohibits the convenient use of a truck or other similar motor vehicle for their movement. Furthermore, when only short distance movement is necessary, the use of a truck or other similar motor vehicle for movement of picnic tables and certain other of such objects is inconvenient even when the location within the campground or park conveniently permits such use.

It is not uncommon for the person or persons responsible for campground and park maintenance activities to experience backstrain or other similar personal injury when moving picnic tables, charcoal grills, garbage cans and other heavy objects. Such personal injury often occurs even when a truck or other similar motor vehicle is used for such movement. And, of course, such persons often experience fatigue even when no backstrain or other personal injury is experienced. This is particularly true when only one person is available for such movement.

It is desirable to have a means for conveniently moving picnic tables, charcoal grills, garbage cans and other similar heavy objects commonly found in campgrounds, parks and the like with minimum risk of backstrain or other personal injury to the person or persons using such means. It is also desirable to have such a means which is suitable for convenient use by only one person. Furthermore, it is desirable to have such a means which is suitable for convenient use on lawns and other off-the-road locations withhin campgrounds, parks and the like. Such a means should perferably be relatively inexpensive and adaptable for multiple uses.

It is not believed that the prior art provides a satisfactory means for moving picnic tables, charcoal grills, garbage cans and other similar heavy objects from location to location within campgrounds, parks and the like. In particular, while the prior art provides various dollys, including the rubber-tired dolly which is disclosed in U.S. Pat. No. 3,105,698, for a "Dolly for Enabling a Single Operator to Move a Work Table" issued to Bonarrigo, et al., it is not believed that such prior art dollys are suitable for use in the environment presented by a campground, park or the like. Furthermore, such prior art dollys are each intended for one specific use rather than use as a component of a dolly system for campgrounds, parks and the like.

SUMMARY OF THE INVENTION

The present invention provides a dolly system for campgrounds, parks and the like. The dolly system of the present invention is comprised of two dollys, a picnic table dolly and a general purpose dolly, and various attachments for the general purpose dolly.

The picnic table dolly included in the dolly system of the present invention comprises an adjustable width, open channel support frame having an essentially U-shaped, open wheel housing on each of its ends. A conventional rubber tired bicycle wheel or other suitable lightweight rubber tired wheel is rotatably mounted in each of the U-shaped open wheel housings. The axles or other means for rotatably mounting the rubber tired wheels are positioned in a horizontal plane above the level of the open channel frame to provide a low center of gravity and a high degree of stability for the picnic table dolly. An elongated, adjustable length handle is provided for the convenience of the user of the picnic table dolly.

The general purpose dolly which is included in the dolly system of the present invention comprises a pair of elongated L-shaped handle elements and a pair of shorter L-shaped frame elements, all of which are positioned parallel to each other. The handle elements are fixedly positioned between the frame elements by spacer elements and a first cross bar. Such positioning of the handle elements and the frame elements creates a pair of wheel openings, each of which has a conventional rubber tired bicycle wheel or other suitable lightweight rubber tired wheel rotatably mounted therein. As in the case with the picnic table dolly, the axles or other means for rotatably mounting the rubber tired wheels of the general purpose dolly are positioned to provide a low center of gravity and a high degree of stability. A coupler which is suitable for use with attachments having either male or female coupling means is provided on the lower cross bar. A second cross bar interconnects the upper ends of the handle elements and functions as a hand grip for the user of the general purpose dolly.

The dolly system of the present invention includes various attachments for the general purpose dolly. All such attachments have either a male or a female coupling means compatible with the coupler on the general purpose dolly. When a support channel is attached, the general purpose dolly can be used in combination with the picnic table dolly to move a conventional picnic table. In such case, the legs on one end of the picnic table are inserted in the open channel support frame of the picnic table dolly and the support channel on the general purpose dolly engages the cross bar on the other end of the picnic table. Other attachments for the general purpose dolly include a single garbage can holding attachment, a dual garbage can holding attachment, a trailer connecting ball attachment, a grill holding attachment, and a platform attachment.

These and many other advantages, features and objects of the present invention will be apparent from the following brief description of drawings, description of the preferred embodiment, claims and accompanying drawings.

BRIEF DESCRIPTION OF THE DRAWINGS

FIG. 1 is a front view of the adjustable width picnic table dolly included in the dolly system of the present invention.

FIG. 2 is a side view of the picnic table dolly shown in FIG. 1.

FIG. 3 is a view taken along Line 3-3 in FIG. 1 illustrating the cross-sectional configuration of the support frame of the picnic table dolly and typical fastening means for the individual frame elements and extension element which comprise said frame.

FIG. 4 is a side view of the general purpose dolly included in the dolly system of the present invention.

FIG. 5 is a front view of the general purpose dolly illustrated in FIG. 4.

FIG. 6 is a top view of the general purpose dolly shown in FIGS. 4 and 5.

FIG. 7 is a side view of a single garbage can holding attachment for the general purpose dolly shown in FIGS. 4, 5 and 6.

FIG. 8 is a top view of the single garbage can holding attachment shown in FIG. 7.

FIG. 9 is a side view of a trailer connecting ball attachment for the general purpose dolly shown in FIGS. 4, 5 and 6.

FIG. 10 is top view of the trailer connecting ball attachment shown in FIG. 9.

FIG. 11 is a side view of a dual garbage can holding attachment for the general purpose dolly shown in FIGS. 4, 5 and 6.

FIG. 12 is a top view of the dual garbage can holding attachment shown in FIG. 11.

FIG. 13 is a side view of a grill holding attachment for the general purpose dolly shown in FIGS. 4, 5 and 6.

FIG. 14 is a top view of the grill holding attachment shown in FIG. 13.

FIG. 15 is a side view of a platform attachment for the general purpose dolly shown in FIGS. 4, 5 and 6.

FIG. 16 is a top view of the platform attachment shown in FIG. 15.

FIG. 17 is a perspective view showing both the picnic table dolly and general purpose dolly positioned for movement of a picnic table.

DETAILED DESCRIPTION OF THE PREFERRED EMBODIMENT

The preferred embodiment of the dolly system of the present invention is illustrated in FIGS. 1-17.

Referring to FIGS. 1-3, an adjustable width picnic table dolly 20 is illustrated supporting one end of a conventional picnic table 22 illustrated in phantom. The picnic table dolly 20 comprises a pair of identical open channel frame elements 24 and an extension element 26 connected by conventional fastening means, such as a plurality of machine bolts 28 and lock washers 30, to form an adjustable width support frame for the legs 32 on one end of the picnic table 22. Each of the frame elements 24 has a guide or stop 34 which facilitates insertion of one leg 32 of the picnic table 22 in the open channel of the frame element 24. Each of the frame elements 24 has an essentially u-shaped open wheel housing 36 fixedly attached to its outside end. The frame element 24, extension element 26, and wheel housings 36 are preferably fabricated by cutting commercially available steel channel stock in the desired lengths and welding the individual lengths as appropriate to form the desired configuration.

A rubber tired wheel 38 is rotatably mounted in the opening of each wheel housing 36 by conventional means, such as an axle 40. The rubber tired wheels 38 are preferably conventional bicycle wheels for ease of rolling over the lawns of campgrounds, parks and the like. As best illustrated in FIG. 1, the axles 40 are positioned in a horizontal plane above the level of the frame elements 24 to provide a low center of gravity and a high degree of stability for the picnic table dolly 20.

To facilitate movement of the picnic table dolly 20 prior to its use and insertion of the legs 32 of the picnic table 22 in the open channels of the frame elements 24, a pair of handle elements 42 interconnected by suitable means, such as a connecting rod 44 fitted in hollow ends thereof, are fastened to the outside ends of the wheel housings 36 by conventional means, such as machine bolts and lock washers not illustrated. As best illustrated in FIGS. 1 and 17, the height of the handle formed by the handle elements 42 must be greater than the height of a conventional picnic table 22 to permit use of the picnic table dolly 20 for its intended purpose. However, it is preferable that the height of the handle so formed be no more than one or two feet higher than the height of a conventional picnic table 22 for the convenience of users of the picnic table dolly 20.

The picnic table dolly 20 can be used to move a conventional picnic table 22 by first inserting the legs 32 on one end of the picnic table 22 in the open channel formed by the frame elements 24. This can be easily accomplished by rolling the picnic table dolly 20 under the end of the picnic table 32, holding one of the handle elements 42 with one hand to maintain the picnic table dolly 20 in position, and lifting the end of the picnic table 22 to insert its legs 32 in the open channel. Then, the user of the picnic table dolly 20 walks to the other end of the picnic table 22 and lifts and pushes that end to move the picnic table 22. While this method of moving a picnic table 22 with the picnic table dolly 20 is relatively simple, it is preferable to have a second dolly, such as the general purpose dolly 70 hereinafter described, for use in combination with the picnic table dolly 20 as illustrated in FIG. 17.

Referring to FIGS. 4-6, the general purpose dolly 50 which is illustrated comprises a pair of elongated L-shaped handle elements 52 and a pair of shorter L-shaped frame elements 54. The handle elements 52 and frame elements 54 are all parallel to each other with the handle elements 52 positioned between the frame elements 54. Three spacer elements 56 interconnect the handle elements 52 and the frame elements 54 at the upper ends of the frame elements 54 and a cross bar 58 interconnects the handle elements 52 and the frame elements 54 at their respective lower ends. A cross bar 60 interconnects the upper ends of the handle elements 52 and provides a hand grip for the user of the general purpose dolly 50. Preferably, the handle elements 52 and frame elements 54 are fabricated by cutting commercially available hollow bar steel in the desired lengths and welding the individual lengths as appropriate to form the desired configuration.

A plate 62 having an open slot 64 is fixedly positioned in the corner of each L-shaped handle element 52 and each L-shaped frame element 54 by conventional means, such as welding. A rubber tired wheel 66 is rotatably mounted in the opening between each adjacent pair of one handle element 52 and one frame element 54 by means of an axle 68 which spans the opening with its ends fitted into the open slots 64 of adjacent plates 62 and fastened thereto by conventional means, such as lock washers 70. As with the picnic table dolly 20, the rubber tired wheels 66 of the general purpose dolly 50 are preferably conventional bicycle wheels for ease of rolling over the lawns of campgrounds, parks and the like. In like manner, the axles 68 are positioned to provide a low center of gravity and a high degree of stability for the general purpose dolly 50.

The cross bar 58 interconnecting the lower ends of the handle elements 52 and the frame elements 54 is preferably provided with a coupler 72 fixedly positioned at the center of and perpendicular to the cross bar 58. Preferably, the coupler 72 is a hollow, open ended structure which extends above and below the level of the cross bar 58. In this manner, the coupler 72 is suitable for use with attachments having either male or female coupling means.

In FIGS. 4, 5 and 6, a support channel 74 is removeably attached to the general purpose dolly 50 by inserting a shaft 76 fixedly attached perpendicular to the channel 74 in the opening of the coupler 72 such that the channel 74 rests on the top of the coupler 72. With the channel 74 attached, the general purpose dolly 50 can be used in combination with the picnic table dolly 20 to move a conventional picnic table 22. As illustrated in FIG. 17, one end of the conventional picnic table 22 is loaded on the picnic table dolly 20 by insertion of the legs 32 in the open channel formed by the frame elements 24. Then, the general purpose dolly 50 is rolled under the other end of the picnic table 22 to position the support channel 74 under the cross bar 78 of the picnic table 22. The picnic table 22 is then moved by pressing down and pulling the cross bar 58 which interconnects the handle elements 52 of the general purpose dolly 50.

In addition to its use in combination with the picnic table dolly 20 for moving picnic tables 22, the general purpose dolly 50 is adaptable for various other campground and park maintenance activities. This is preferably accomplished by providing various attachments with either male or female coupling means compatible with the coupler 72. Preferably, such attachments are fabricated from hollow bar steel by cutting and welding. For example, the single garbage can holding attachment 80 illustrated in FIGS. 7 and 8 comprises an essentially L-shaped support element 82 having a coupler 84 which fits over the coupler 72. The support element 82 has a pair of prongs 86 fixedly attached to its vertical portion to engage the sides of the garbage can 88 while the bottom of the garbage can 88 rests on its horizontal portion.

If it is desired to have a dual garbage can holding attachment 90 as illustrated in FIGS. 11 and 12, two essentially L-shaped support elements 92, each having a coupler 94 and a pair of prongs 96 to engage a garbage can 98, are linked with a horizontal cross bar 100. In such case, it is necessary to provide two couplers 72 on the cross bar 58 of the general purpose dolly 50. It would be possible, of course, to provide only one coupler 94 on the cross bar 100 or a similar horizontal connecting element which fits over one coupler 72 on the cross bar 58 of the general purpose dolly 50. However, such an attachment would lack the structural stability and strength of the dual garbage can holding attachment 90 illustrated in FIGS. 11 and 12.

The trailer connecting ball attachment 102 illustrated in FIGS. 9 and 10 enables the general purpose dolly 50 to be used for moving trailers and the like during campground and park maintenance activities. The trailer connecting ball attachment 102 comprises a conventional trailer connecting ball 104 having a coupler 106 welded thereto. As illustrated, the coupler 106 fits over the coupler 72 on the cross bar 58 of the general purpose dolly 50. Attachments for trailers having other types of connecting means could be provided for the general purpose dolly 50 if desired.

FIGS. 13 and 14 illustrate a grill holding attachment 108 which enables the general purpose dolly 50 to be used for moving charcoal grills and the like during campground and park maintenance activities. The grill holding attachment 108 comprises a V-shaped holding means 110 having a coupler 112 welded thereto. As illustrated, the coupler 112 is a shaft which is inserted in the coupler 72 on the cross bar 58 of the general purpose dolly 50. A chain 114 or other similar flexible securing means having one end fixedly attached to the V-shaped holding means 110 and a suitable fastening means, such as a threaded extension 116 on the other end of the chain 114 and a wing nut 117, are provided for securing the support post 118 of a grill 120 to the V-shaped holding means 110.

In FIGS. 15 and 16, the platform attachment 122 which is illustrated enables the general purpose dolly 50 to be used for moving boxes, firewood, stones and other similar objects during campground and park maintenance activities. The platform attachment 122 comprises a horizontal platform 124 fixedly positioned perpendicular to a vertical plate 126. A pair of couplers 128 are welded to the back of the vertical plate 126. As illustrated, the couplers 128 fit over a pair of couplers 72 on the cross bar 58 of the general purpose dolly 50. The platform attachment 122 and various other attachments which have been described and illustrated are only representative of numerous attachments which could be provided for the general purpose dolly 50 using the principles and structures which have been disclosed.

While the present invention has been disclosed in connection with the preferred embodiment, it should be understood that there may be other embodiments which fall within the spirit and scope of the invention as defined by the following claims.

I claim:
1. A picnic table dolly, comprising:
   (a) an adjustable width, open channel support frame adapted for supporting the legs on one end of the picnic table to be moved;
   (b) a pair of essentially U-shaped open wheel housings, each fixedly attached to one end of said adjustable width, open channel support frame;
   (c) a pair of rubber tired wheels, each rotatably mounted in one of said essentially U-shaped open wheel housings above the level of said adjustable width, open channel support frame; and
   (d) an elongated adjustable length handle, one end of which is fastened to one of said essentially U-shaped open wheel housings and the other end of which is fastened to the other of said essentially U-shaped open wheel housings, said handle extending above and parallel to said adjustable width, open channel support frame at a height which is greater than the height of the picnic table to be moved.

2. A picnic table dolly as recited in claim 1, further comprising a pair of guides or stops on said adjustable width, open channel support frame, said pair of guides or stops being adapted for engaging the legs on one end of the picnic table to be moved.

3. A picnic table dolly as recited in claim 1, wherein said adjustable width, open channel support frame comprises a pair of identical open channel frame elements, an extension element, and means for fastening said extension element to said open channel frame elements.

4. A picnic table dolly as recited in claim 3, further comprising a guide or stop on each of said open channel frame elements, said guide or stop being adapted for engaging one of the legs on one end of the picnic table to be moved.

5. A picnic table dolly as recited in claim 1, wherein said elongated adjustable length handle comprises a pair of identical handle elements interconnected with a connecting rod fitted in adjacent hollow ends thereof, one of said handle elements being fastened to one of said essentially U-shaped open wheel housings and the other of said handle elements being fastened to the other of said essentially U-shaped open wheel housings.

6. A dolly system for moving picnic tables or the like, comprising:

a first dolly having an adjustable width, open channel support frame adapted for supporting the legs on one end of the picnic table to be moved, a pair of essentially U-shaped open wheel housings, each fixedly attached to one end of said adjustable width, open channel support frame, a pair of rubber tired wheels, each rotatably mounted in one of said essentially U-shaped open wheel housings above the level of said adjustable width, open channel support frame, and an elongated adjustable length handle, one end of which is fastened to one of said essentially U-shaped open wheel housings and the other end of which is fastened to the other of said essentially U-shaped open wheel housings, said handle extending above and parallel to said adjustable width, open channel support frame at a height which is greater than the height of the picnic table to be moved; and a second dolly having a pair of parallel, elongated L-shaped handle elements, a pair of parallel, shorter L-shaped frame elements, said shorter L-shaped frame elements being parallel to said elongated L-shaped handle elements, a plurality of spacer elements interconnecting said elongated L-shaped handle elements and said shorter L-shaped frame elements at the upper ends of said frame elements, a first cross bar interconnecting said elongated L-shaped elements and said shorter L-shaped frame elements at the lower ends thereof such that said elongated L-shaped handle elements are positioned between said shorter L-shaped frame elements, a pair of rubber tired wheels, each rotatably mounted between one of said elongated L-shaped handle elements and one of said shorter L-shaped frame elements above the level of the lower portions of said elongated L-shaped handle elements and said shorter L-shaped frame elements, a second cross bar interconnecting the upper ends of said elongated L-shaped handle elements, said second cross bar being adapted for functioning as a hand grip, and a support channel attached to said first cross bar, said support channel being adapted for supporting the cross bar on the other end of the picnic table to be moved.

7. A dolly system as recited in claim 6, further comprising a pair of guides or stops on said adjustable width, open channel support frame of said first dolly, said pair of guides or stops being adapted for engaging the legs on one end of the picnic table to be moved.

8. A dolly system as recited in claim 6, wherein said adjustable width, open channel support frame of said first dolly comprises a pair of identical open channel frame elements, an extension element, and means for fastening said extension element to said open channel frame elements.

9. A dolly system as recited in claim 8, further comprising a guide or stop on each of said open channel frame elements of said first dolly, said guide or stop being adapted for engaging one of the legs on one end of the picnic table to be moved.

10. A dolly system as recited in claim 6, wherein said elongated adjustable length handle of said first dolly comprises a pair of identical handle elements interconnected with a connecting rod fitted in adjacent hollow ends thereof, one of said handle elements being fastened to one of said essentially U-shaped open wheel housings and the other of said handle elements being fastened to the other of said essentially U-shaped open wheel housings.

* * * * *